United States Patent
Kelly et al.

(12) 
(10) Patent No.: US 6,671,510 B1
(45) Date of Patent: Dec. 30, 2003

(54) WIRELESS TELEPHONE SYSTEM AND OPERATION METHOD THEREFOR

(75) Inventors: Ciaran Kelly, Galway (IE); Thomas Moran, Galway City (IE)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/472,449

(22) Filed: Dec. 27, 1999

(51) Int. Cl.⁷ .................................................. H04Q 7/20
(52) U.S. Cl. ...................................... 455/445; 455/432.1
(58) Field of Search ................................. 455/432, 433, 455/435, 458, 445, 556; 370/230, 230.1, 331

(56) References Cited

U.S. PATENT DOCUMENTS

| | | | | |
|---|---|---|---|---|
| 5,459,727 A | * | 10/1995 | Vannucci | 370/332 |
| 6,330,244 B1 | * | 12/2001 | Swartz et al. | 370/401 |
| 6,418,324 B1 | * | 7/2002 | Doviak et al. | 455/556 |
| 6,421,714 B1 | * | 7/2002 | Rai et al. | 709/217 |

OTHER PUBLICATIONS

*European Telecommunications Standard*; ETS 300 757; Internet: Secretariat@etsi.fr, ETSI Secretarial, Apr., 1997.

* cited by examiner

*Primary Examiner*—Nay Maung
*Assistant Examiner*—Tu X Nguyen
(74) *Attorney, Agent, or Firm*—Barnes & Thornburg

(57) ABSTRACT

A system and mechanism for maintaining interactive data services to a cellular radiotelephone (12) as it traverses (30) a network of wireless systems (10) is shown in FIG. 1. These data services are in addition to the standard telephony services. An application server (20, 34) or private branch exchange, local to the cellular radiotelephone, determines whether the radiotelephone is located within its home site or within another visited site. If the radiotelephone is within a visited site then an IP connection is established back to the radiotelephone's home application server allowing data to be routed directly between the home application server (22) and the radiotelephone (10) during a computer telephony integration (CTI) session.

8 Claims, 3 Drawing Sheets

WIRELESS TELEPHONE SYSTEM AND OPERATION METHOD THEREFOR

BACKGROUND TO THE INVENTION

This invention relates, in general, to a system and method for maintaining interactive services to a radiotelephone as it transverses a network of wireless systems and is particularly, but not exclusively, applicable to a digital cordless telephone system or wireless local area network (LAN) environment that supports data services in addition to standard telephony services.

SUMMARY OF THE PRIOR ART

The structure of modern telecommunication systems allows the routing of information such as encoded speech and data, to various forms of communication device. For example, cellular radiotelephones within a cellular service area may communicate with other cellular radiotelephones, landline telephones (via a public switched telephone network, PSTN), or interactive Internet service providers. In addition, there are data services which can be made available to cellular radiotelephone users, such as small message services (SMS).

Interactive data services which require a communication path directly to an application server may currently only be accessed by a radiotelephone located within its home site (where a site is a predetermined geographical area such as a building); this being the case for wireless LAN and digital European Cordless Telephone (DECT)-type systems. However, the primary benefit of a radiotelephone is the mobility it allows its user, but such mobility between sites compromises the ability of the radiotelephone to maintain a consistent level and breadth of interactive and data services (as opposed to voice-only services).

The position concerning the provision of services in a radiotelephone environment can be compared with conventional cellular services, such as the Global System for Mobile (GSM) communication. In GSM, services are generally restricted to those provided by the local service provider, with information transfer between a home location register (HLR) and visiting location register (VLR) restricted to management information to support roaming. In other words, a visited site may contain an inferior service set and so a roaming mobile subscriber unit is potentially restricted in its network interactions, with all such interactions effectively managed from the visited site.

SUMMARY OF THE INVENTION

According to a first aspect of the present invention there is provided a method of managing a data session between a communication device and an application server of a communication network containing at least two coverage areas each having base site equipment supporting a plurality of data services, the method comprising: affiliating the communication device with one of the coverage areas, thereby identifying that coverage area as a home coverage area and wherein the application server provides a predetermined set of data services thereto; during one of at least communication device registration with the communication network and data call set-up, determining whether the communication device is in its home coverage area; and when the communication device is in a coverage area other than its home coverage area, establishing a communication path through the communication network between the application server and the base site equipment providing service to the communication device, thereby remotely to offer the communication device the predetermined set of data services of its home coverage area.

In a preferred embodiment, the predetermined set of data services augment data services offered in said coverage area other than the home coverage area.

In a second aspect of the present invention there is provided a communication system having at least two coverage areas supporting differing data service sets, the at least two coverage areas each having base site equipment supporting data services from dedicated application servers, the communication system containing: means for determining whether a communication device is in its home coverage area; means for establishing a communication path through the communication network between first base site equipment providing service to the communication device and an application server of a home coverage area associated with second base site equipment, the communication path providing a service conduit through which at least one of a set of data services associated with the application server of the home coverage area is supplied to the first base site equipment, thereby remotely to support the communication device serviced by the first base site equipment with the at least one of the set of data services of its home coverage area.

The base site equipment may comprise a private branch exchange coupled to a router, whereby the communication path is established by the router in response to the address. Indeed, the base site equipment may include a DECT or wireless LAN interface.

In a further aspect of the present invention there is provided a method of managing a data session between a radio communication device and an application server having an identity, the application server coupled through a network to home base site equipment serving a first coverage area and second base site equipment serving a second coverage area, the method comprising: establishing the identity of a home application server associated with the communication device; routing the data session from the home application server via the home base site equipment when the radio communication device is in the first coverage area; and routing the data session from the home application server via the second base site when the radio communication device is in the second coverage area.

In another aspect of the present invention there is provided a computer program product for controlling routing of a data session between a communication device and an associated home application server providing a predetermined set of services in a home coverage area, the computer program product comprising: code that directs the router to determine whether the communication device is in the home coverage area; code that directs base site equipment, remote from the home coverage area, servicing the communication device to establish a communication path through a communication network to the home application server, thereby remotely to offer the communication device at least some of the predetermined set of data services of its home coverage area; wherein the codes reside in a computer readable medium.

Advantageously, the present invention allows a mobile conveniently to access its default set of service facilities (as well as any local data services supported by a serving PBX and associated server and in addition to a basic telephony facility subscriber unit), when the subscriber has roamed and is not therefore located within its home site. Provided that the subscriber unit includes a suitable man-machine interface (MMI), such as a character-based display capability, data services provided by a home application server may be accessed in visited sites (i.e. areas which are not the home site for a particular subscriber unit).

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Figure 1:
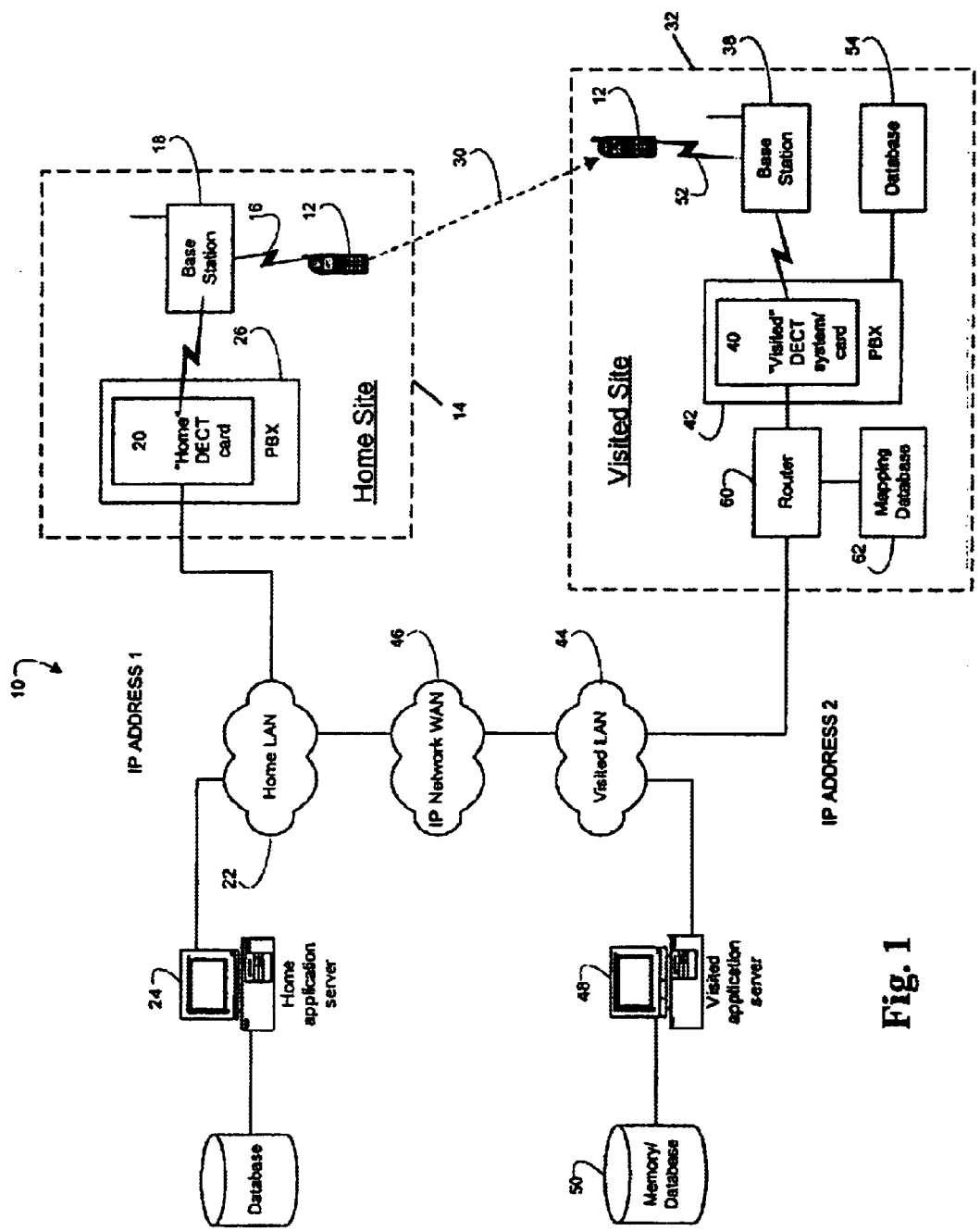
FIG. 1 is a block diagram of a multi-site computer telephony integration (CTI) system according to a preferred embodiment of the present invention.

FIG. 1 illustrates a CTI system 10 adapted to support the concepts of the various embodiments of the present invention. A radiotelephone 12 located initially in its assigned home site 14 has both a basic telephony feature and access to data services. To utilise these data services the radiotelephone 12 includes some form of man-machine interface, preferably in the form of an alpha-numeric display capability. The data services to which the radiotelephone has access typically include some of the following: i) database access, such as telephone directory lookup, price checks and historical data; ii) personal manager applications, such as address book and diaries; iii) short messaging, such as nurse calls, dispatcher information and 2-way messaging; iv) remote control (in terms of alarms setting, electrical controls and environmental controls); v) internet access and e-mail linkage; and vi) prompts, such as visual access to voice mail (e.g. delete, play, etc.).

When located within the home site 14 the portable radiotelephone 12 utilises a conventional radio frequency (rf) communication resource 16 to a local base station 18. This base station 18 is coupled to a "home" digital enhanced cordless telecommunications (DECT) system 20 which, in turn, is coupled to a home local area network (LAN) 22. A home application server 24 provides various applications with which the radiotelephone 12 can interact. Further, the home application server 24 has a unique internet protocol (IP) address (or name). The portable radiotelephone unit 12 houses a non-volatile memory (not shown) which contains the Internet protocol (IP) address (or name) of the home application server 24 (as well as operational firmware and unit-specific data).

From a management perspective, the home LAN 22 provides an IP connection to a DECT card (or the like) of a Private Branch Exchange (PBX) 26 which provides the necessary functionality to support local telephony management, as will readily be appreciated.

It is anticipated that the portable radiotelephone user may traverse 30 from their home site to another "visited" site 32. The visited site 32 could, for example, be another building owned by the system operator (i.e. the PBX owner) but independently controlled. According to the present invention, the user is able to access a full basic telephony service in the visited site that is augmented by the full range of data services available in the home site.

The visited site has generally a similar structure as the home site 14, and thus typically comprises a base station 38 coupled to a DECT line card (or the like) 40 of a PBX 42. The PBX 42 will be coupled to a visited LAN 44 which itself will be coupled to the home LAN 22 via a wide-area network (WAN) 46 or the like supporting IP (or other equivalent communication protocol). The second PBX 42 will typically also have an associated application server 48 (termed "visited application server" in FIG. 1). Again, the visited application server 48 has a unique IP address (stored in memory 50) which supports, for example, Internet protocol communication (or the like).

The system, as with conventional roaming methodologies, operates to register the user 12 with a serving base station upon power-up of the user's radiotelephone. Considering this is a scenario when the user has roamed into a visited site 32, the radiotelephone informs/notifies the base station 38 (and hence the PBX 42) of the visited site that it requires service by sending, for example, an uplink RACH 52 or equivalent registration/access protocol. The uplink RACH 52 will, at some point, include some form of subscriber unit identity (e.g. the radiotelephone's telephone number), which telephone number is stored in the radiotelephone's non-volatile memory. Ultimately, the PBX 42 logs the radiotelephone's number to allow the subsequent set-up of calls therebetween.

Based on the subscriber unit identity, a PBX serving the subscriber unit can ascertain (upon inspection of a service database 54) whether the subscriber unit is within its home-service environment or whether the subscriber is roaming.

Clearly, the subscriber unit identity is therefore sent during any call set-up procedure.

There are two possible ways in which the system of the present invention can proceed in the supply of home-site data services to a roaming subscriber temporarily located in a visiting site. However, in both instances, the effect is identical when considered in relation to a call set-up by the roaming subscriber unit. As previously indicated, the visiting site PBX 42 is aware of the existence of the roaming subscriber unit by virtue of its registration with the visiting site PBX system. Should the user of the roaming device therefore wish to gain access to services from its home-site, then the present invention provides for the IP address of the home application server to be notified to the visiting site PBX 42. Clearly, the IP address of the home application server can be notified at registration of the roaming subscriber unit 12 (and therefore stored in database 54 associated with PBX 42). Alternatively, a smart system could be deployed in which there is a known mapping function between the subscriber unit's identity and its serving home application server 24. In this latter instance, the database of mappings of subscriber identity to home application server IP address will be known essentially on a system-wide basis and updates and modifications would necessarily need to be enacted with changes in system configuration.

Returning to the specific process of establishing a data service connection, the PBX 42 in the visited site 32 is informed by the roaming subscriber unit 12 that a specific data service offered by the subscriber unit's home application server is required. Consequently, the visited PBX 42, rather than attempting to set up the specific data service and failing, identifies the IP address of the home application server and co-operates with a router 60 (generally having its own mapping database 62) to route a datagram to the home application server 24 via the visited LAN 44, the IP WAN 46 and home LAN 22. The datagram is effectively used to establish an IP path through the various LAN and WAN architectures to support a channel having the necessary bandwidth to provide the home-site's specific service to the roaming subscriber terminal in the visited site 32.

Although the access to data services is generally subscriber originated, the present invention can be adapted to provide data service access to the roaming subscriber unit 12 in a visited site 32. In this instance, as will be appreciated, it is necessary for the roaming subscriber unit to be temporarily associated with the PBX 42 of the visited site 32, or for a paging function to be enacted on a site-by-site or system-wide basis. Temporary association may be achieved through the down-load of data to a suitable information node, such as the home PBX 26 of the subscriber unit 12. In a similar way to GSM, interaction between the local and visiting PBXs can ensure that the location of the roaming subscriber unit is identified and that information transfer is appropriately routed through the LAN and WAN to the serving base station 38 associated with the visited site PBX 42.

In a preferred embodiment, the radiotelephone uses a DECT E.2 profile to set up the data connection with an application server and the exchange of IP address information (indicated above) occurs via this mechanism. Initially, therefore, a portable entering a visited site 32 registers its presence with the visited application server 48 associated with the visited site 32. Subsequently, either independently or following a prompt from the visited application server 48, the radiotelephone 12 transmits the IP address (or identity) of its home application server 24 to the visited application server (via the serving base station 38 and PBX 42). The visited application server 48 upon noticing a discrepancy in IP addresses (or identity) between itself and the home application server of the radiotelephone 12 is then configured to set up a communication path through the network back to the home application server 24. The visited application server 48 can then selectively act as a router if the radiotelephone 12 wishes to access data services solely supported remotely by its home application server 24. Consequently, the PBX and router arrangement previously described can be omitted and the system simplified in design.

The above described telecommunication interaction is known as "computer telephony integration" (CTI). The ability of the radiotelephone to maintain data services when traversing from site to site is therefore referred to as multi-site CTI. When a CTI session is in progress, the present invention ensures that, if desired, the radiotelephone user has access to the full range of services provided by the home application server. Furthermore, a home application server can send alpha-numeric messages to the radiotelephone to control the radiotelephone, but at least indicates that contact from the home application server is wanting to be established thereto. The application servers within the system can, if desired, control display icons on the MMI and context sensitive prompts can be displayed opposite handset softkeys. Features of the link from the radiotelephone to the application server include the ability of the server to accept keypress information from the handset, to act upon this information by updating the portable display and/or perform other requested or defined actions.

Figure 2:
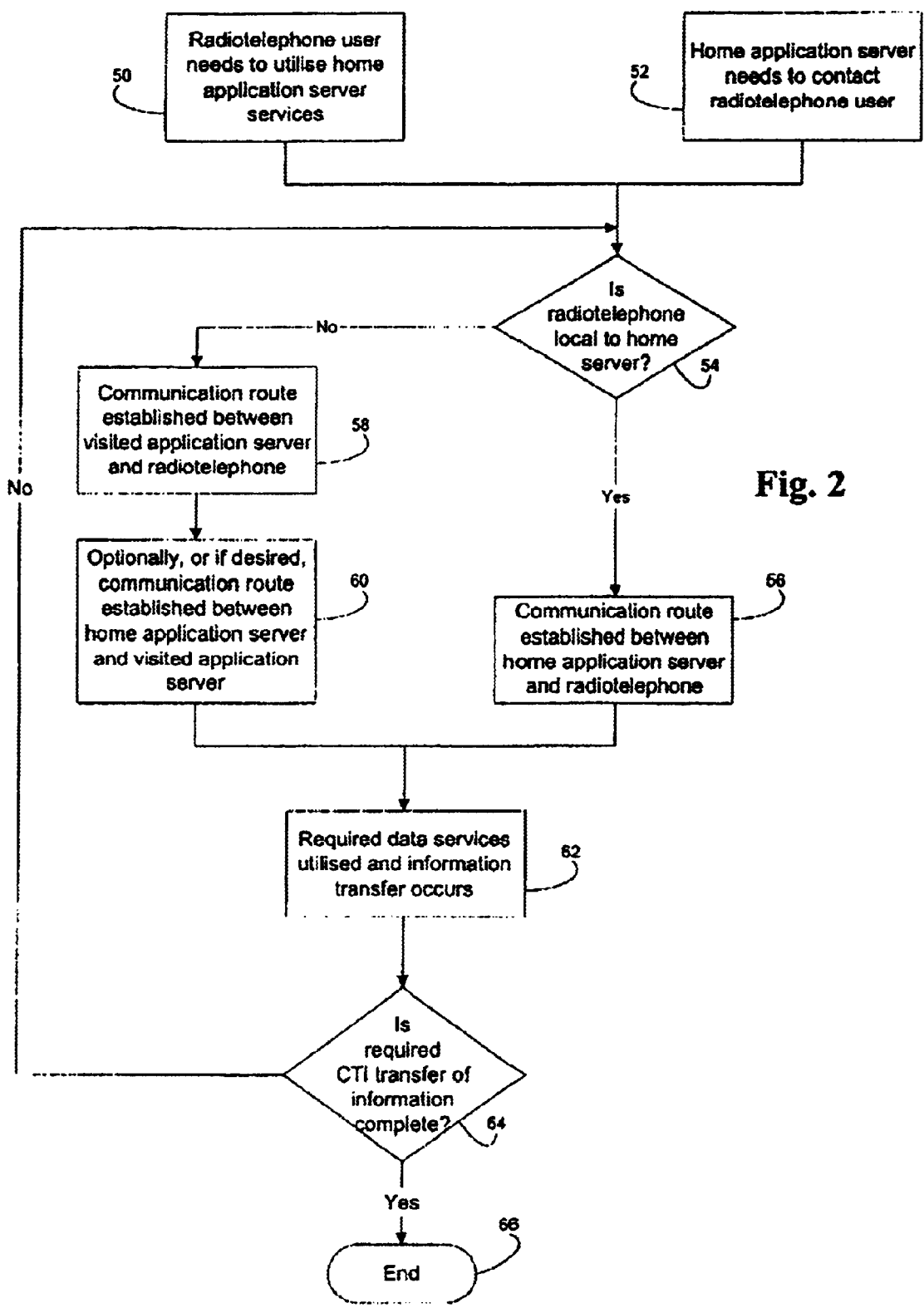
FIG. 2 is a flow diagram illustrating preferred operating methods during the implementation of multi-site CTI.

FIG. 2 illustrates the method steps involved in a CTI transfer of information according to preferred operating methodologies of the present invention. The process may begin at one of two possible blocks. Either the radiotelephone user may decide 50 they require a service(s) provided by their home application server, or the home application server may be instructed (52) to contact the radiotelephone user with information from a data service. The server local to the radiotelephone examines the IP address of the normal home-site of the radiotelephone and establishes 54 whether the radiotelephone 10 is located within its home site or a visited site. If the radiotelephone 10 is located within its home site a communication route, over home LAN 22, may be established 56 between the home application server 20 and radiotelephone, thus enabling the user to access the full range of data services. However, if the radiotelephone is not located within its home site then a communication route must be established 58 between both the radiotelephone and the visited server and also 60 the home server and the visited server.

Once such a connection has been established, the location of the radiotelephone is immaterial and the user has full access to the required data services and any necessary transfer 62 of information occurs via the routes as illustrated in FIG. 1. After the required CTI transfer of information is complete 64, the user or the home application server may terminate 66 the data link, thus ending the data transfer session. However, it is also necessary for the location of the radiotelephone to be re-established 54 during the data transfer session to allow for the possibility that the user has moved from one site into a second site during the course of the data transfer session. The second site may contain the home application server 24 or a visited application server 48 and so the same method steps are followed as previously indicated.

Figure 3:
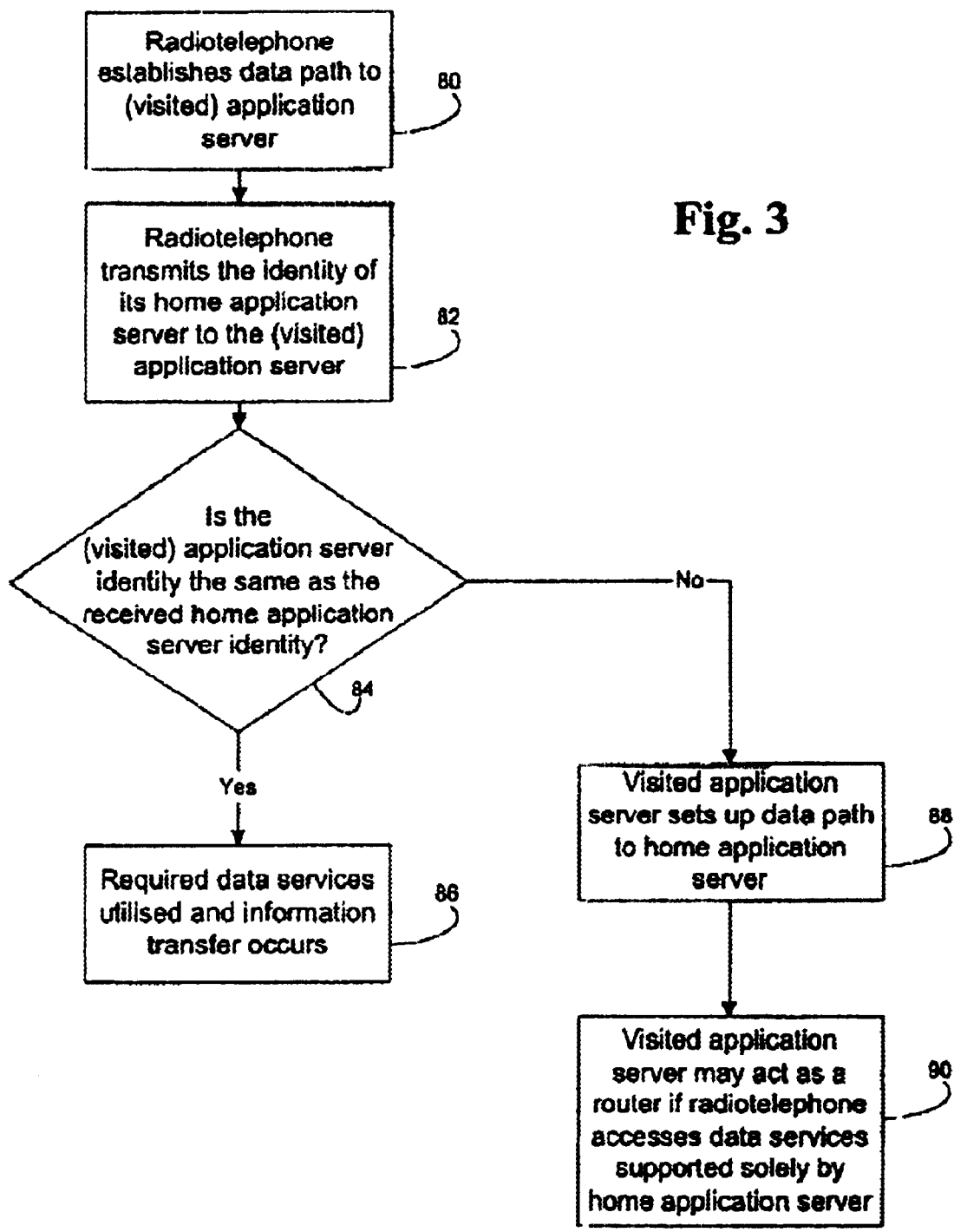
FIG. 3 is a flow diagram illustrating an alternative operating method of multi-site CTI.

FIG. 3 illustrates the method steps involved in a CTI transfer of information according to an alternative embodiment of the present invention. The process begins at block 80 when a radiotelephone establishes its presence with the local application server. The radiotelephone then transmits 82 the IP address (or identity) of its home application server to the local application server. The local application server then determines 84 if the IP address (or identity) of the home application server of the radiotelephone is the same as its own IP address (or identity). If the addresses are the same then the radiotelephone is within its home site and the data session may commence 86. However, a discrepancy between the two addresses means the radiotelephone is located within a visited site and the visited application server sets up 88 a data path to the home application server. The visited application server can then selectively act 90 as a router if the radiotelephone wishes to access data services solely supported remotely by its home application server.

It will, of course, be appreciated that the above description has been given by way of example only and that modifications may be made within the scope of the present invention. For example, it will be understood that the underlying inventive concept is not limited to a DECT (or even wireless LAN) environment, but instead has application to augment functionality provided in cellular systems. It will be appreciated by one skilled in the art that the software code required to identify the home application server of a radiotelephone is a relatively basic application and necessary for the implementation of multi-site CTI.

What is claimed is:

1. A method of managing a data session between a telephonic communication device capable of receiving data services and an application server of a communication network containing a least two coverage areas each having base site equipment including a respective application server supporting a plurality of data services, each said application server having a respective network address, the method comprising:

affiliating the communication device with one of the coverage areas, thereby identifying that coverage area as a home coverage area and wherein the application server for the home coverage area provides a predetermined set of data services to the communication device;

during one of at least communication device registration with the communication network and data call set-up, determining whether the communication device is in its home coverage area by comparing the network address of the application server of the communication device's home coverage area with the network address of the application server of the coverage area in which the communication device is currently located; and when the communication device is in a coverage area other than its home coverage area, establishing a communication path through the communication network between the application server of the coverage area in which the communication device is currently located and the application server of the communication device's home coverage area, thereby remotely to offer the communication device the predetermined set of data services of its home coverage area, wherein said communication path is established by sending the address of the application server of the communication device's home coverage area from the communication device.

2. The method according to claim 1, wherein the predetermined set of data services augment data services offered in said coverage area other than the home coverage area.

3. The method according to claim 1, wherein determining whether the communication device is in its home coverage area includes:

storing in the network an association between the communication device and the application server of the communication device's home coverage area.

4. The method according to claim 1, further comprising:

initiating the data session from the application server of the communication device's home coverage area.

5. A communication system having at least two coverage areas supporting differing data service sets, the at least two coverage areas each having base site equipment supporting data services from respective application servers each having a respective network address, the communication system containing:

means for determining whether a telephonic communication device capable of receiving data services is in its home coverage area by comparing the network address of the application server of the communication device's home coverage area with the network address of the application server of the coverage area in which the communication device is currently located; and means operative when the communication device is in a coverage area other than its home coverage area for establishing a communication path through the communication network between the application server of the coverage area in which the communication device is currently located and the application server of the communication device's home coverage area, thereby remotely to offer the communication device the predetermined set of data services of its home coverage area, wherein the means for establishing the communication path is responsive to the address of the application server of the communication device's home coverage area received from the communication device.

6. The communication system of claim 5, wherein the set of data services augment data services offered by said first base site equipment.

7. The communication system of claim 5, wherein the base site equipment comprises a private branch exchange coupled to a router, whereby the communication path is established by the router in response to the address.

8. The communication system of claim 7, wherein the base site equipment includes a DECT interface.

* * * * *